US012683866B2

(12) United States Patent
Mehta et al.

(10) Patent No.: US 12,683,866 B2
(45) Date of Patent: Jul. 14, 2026

(54) REVERSING DIRECTION OF PACKET TRANSMISSION IN A NETWORK HAVING A RING TOPOLOGY

(71) Applicant: Ciena Corporation, Hanover, MD (US)

(72) Inventors: Pranav Mehta, San Jose, CA (US);
Muthurajah Sivabalan, Ottawa (CA);
Sami Boutros, Union City, CA (US)

(73) Assignee: Ciena Corporation, Hanover, MD (US)

( * ) Notice: Subject to any disclaimer, the term of this patent is extended or adjusted under 35 U.S.C. 154(b) by 140 days.

(21) Appl. No.: 17/974,725

(22) Filed: Oct. 27, 2022

(65) Prior Publication Data

US 2023/0412462 A1     Dec. 21, 2023

Related U.S. Application Data

(63) Continuation-in-part of application No. 17/841,728, filed on Jun. 16, 2022, now Pat. No. 12,476,906.

(51) Int. Cl.
| | |
|---|---|
| *G06F 15/173* | (2006.01) |
| *H04L 12/42* | (2006.01) |
| *H04L 41/12* | (2022.01) |
| *H04L 45/50* | (2022.01) |

(52) U.S. Cl.
CPC .............. *H04L 41/12* (2013.01); *H04L 12/42* (2013.01); *H04L 45/507* (2013.01)

(58) Field of Classification Search
CPC ....... H04L 41/12; H04L 12/42; H04L 45/507; H04L 45/28
USPC ........................................................ 709/223
See application file for complete search history.

(56) References Cited

U.S. PATENT DOCUMENTS

| | | | |
|---|---|---|---|
| 7,120,792 B1 | 10/2006 | Jacobson et al. | |
| 7,197,573 B1 | 3/2007 | Jacobson et al. | |
| 7,430,176 B2 | 9/2008 | Nalawade et al. | |
| 7,539,191 B1 | 5/2009 | Jacobson | |

(Continued)

FOREIGN PATENT DOCUMENTS

| | | |
|---|---|---|
| EP | 2 963 872 A1 | 1/2016 |
| EP | 3 038 301 B1 | 3/2020 |
| WO | 2021/0967231 A1 | 4/2021 |

OTHER PUBLICATIONS

Sep. 14, 2023, International Search Report and Written Opinion for International Application No. PCT/US2023/025553.

*Primary Examiner* — Vivek Srivastava
*Assistant Examiner* — Karina J Garcia-Ching
(74) *Attorney, Agent, or Firm* — Baratta Law PLLC; Lawrence A. Baratta, Jr.

(57)     ABSTRACT

A method implemented by a node in a network having a ring topology includes the step of discovering a first peer node arranged in a first direction around the ring with respect to the node. The method further includes the step of discovering a second peer node arranged in a second direction around the ring with respect to the node. Upon determining that data packets are propagating in the first direction and communication with the first peer node is interrupted, the method include performing a direction reversal procedure to propagate the data packets in the second direction. In response to the second peer node being unable to perform the direction reversal procedure, the method includes the step of tunnelling the data packets to a next node in the second direction to thereby bypass the second peer node.

15 Claims, 7 Drawing Sheets

(56) References Cited

U.S. PATENT DOCUMENTS

| | | | |
|---|---|---|---|
| 7,684,351 B2 | 3/2010 | Vasseur et al. | |
| 8,135,834 B1 | 3/2012 | Jacobson et al. | |
| 8,274,901 B1 | 9/2012 | Casner et al. | |
| 8,422,502 B1 | 4/2013 | Alaettinoglu et al. | |
| 8,824,331 B1 | 9/2014 | Alaettinoglu et al. | |
| 8,937,946 B1 | 1/2015 | Kanna et al. | |
| 9,979,629 B2 | 5/2018 | Sivabalan et al. | |
| 10,033,623 B2 | 7/2018 | Jain et al. | |
| 10,158,558 B1 | 12/2018 | Ward et al. | |
| 10,165,093 B2 | 12/2018 | Filsfils et al. | |
| 10,171,338 B2 | 1/2019 | Filsfils et al. | |
| 10,250,494 B2 | 4/2019 | Sivabalan et al. | |
| 10,277,558 B2 | 4/2019 | Khan et al. | |
| 10,291,516 B2 | 5/2019 | Bryant et al. | |
| 10,454,821 B2 | 10/2019 | Filsfils et al. | |
| 10,567,295 B2 | 2/2020 | Barton et al. | |
| 10,740,408 B2 | 8/2020 | Ramasamy et al. | |
| 10,833,976 B2 | 11/2020 | Saad et al. | |
| 10,868,755 B2 | 12/2020 | Filsfils et al. | |
| 11,057,278 B1 | 7/2021 | Côté et al. | |
| 2007/0237072 A1 | 10/2007 | Scholl | |
| 2011/0038255 A1* | 2/2011 | Zhou | H04L 45/60 |
| | | | 370/218 |
| 2012/0113798 A1* | 5/2012 | Florit | H04L 12/42 |
| | | | 370/258 |
| 2015/0271034 A1 | 9/2015 | Kanna et al. | |
| 2015/0381408 A1* | 12/2015 | Kompella | H04L 41/0836 |
| | | | 370/222 |
| 2016/0057049 A1 | 2/2016 | Jacobson et al. | |
| 2016/0191324 A1 | 6/2016 | Olofsson et al. | |
| 2019/0297017 A1 | 9/2019 | Pignataro et al. | |
| 2019/0379601 A1 | 12/2019 | Khan et al. | |
| 2020/0112495 A1 | 4/2020 | Attarwala et al. | |
| 2020/0153856 A1 | 5/2020 | Nainar et al. | |
| 2020/0220811 A1 | 7/2020 | Shah | |
| 2021/0092043 A1 | 3/2021 | Filsfils et al. | |
| 2021/0160174 A1 | 5/2021 | Kashyap et al. | |
| 2021/0243095 A1 | 8/2021 | Attarwala et al. | |

* cited by examiner

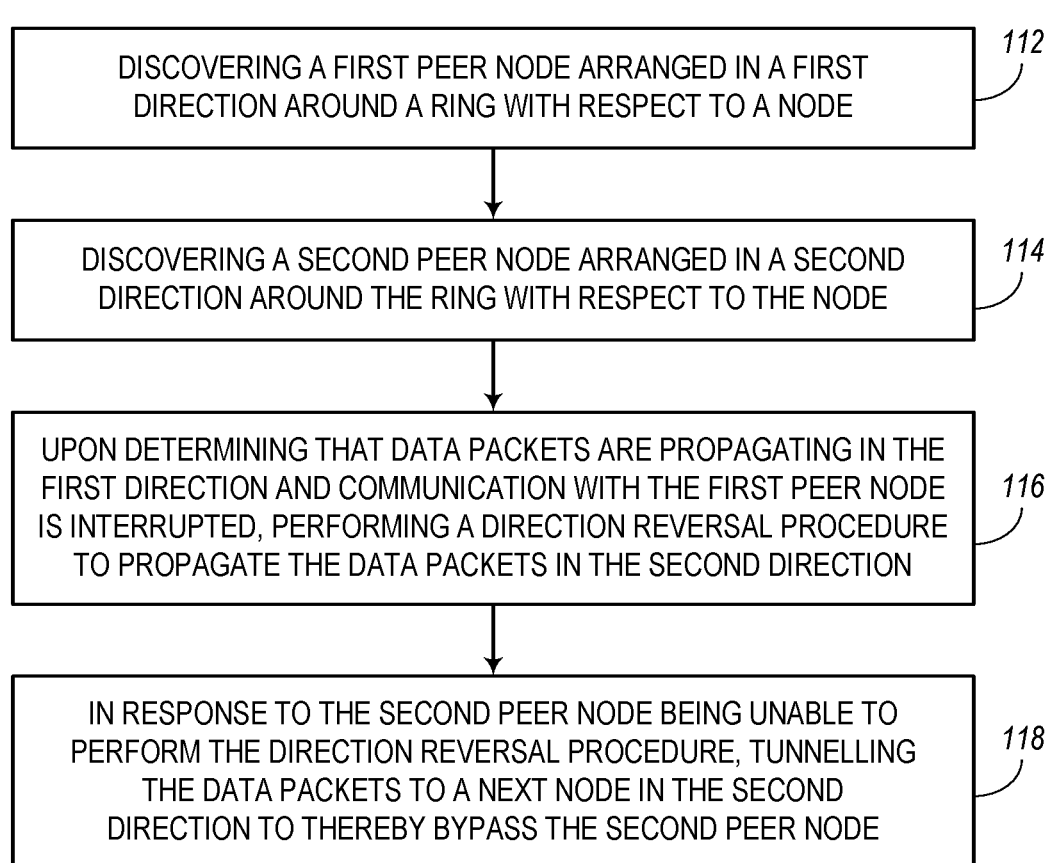

*110*

DISCOVERING A FIRST PEER NODE ARRANGED IN A FIRST DIRECTION AROUND A RING WITH RESPECT TO A NODE
*112*

DISCOVERING A SECOND PEER NODE ARRANGED IN A SECOND DIRECTION AROUND THE RING WITH RESPECT TO THE NODE
*114*

UPON DETERMINING THAT DATA PACKETS ARE PROPAGATING IN THE FIRST DIRECTION AND COMMUNICATION WITH THE FIRST PEER NODE IS INTERRUPTED, PERFORMING A DIRECTION REVERSAL PROCEDURE TO PROPAGATE THE DATA PACKETS IN THE SECOND DIRECTION
*116*

IN RESPONSE TO THE SECOND PEER NODE BEING UNABLE TO PERFORM THE DIRECTION REVERSAL PROCEDURE, TUNNELLING THE DATA PACKETS TO A NEXT NODE IN THE SECOND DIRECTION TO THEREBY BYPASS THE SECOND PEER NODE
*118*

FIG. 10

REVERSING DIRECTION OF PACKET TRANSMISSION IN A NETWORK HAVING A RING TOPOLOGY

CROSS-REFERENCE TO RELATED APPLICATION

This application is a Continuation-In-Part (CIP) application of U.S. patent application Ser. No. 17/841,728, filed Jun. 16, 2022, and entitled "Label Distribution Protocol (LDP) convergence in ring topologies," the contents of which are incorporated by reference herein.

FIELD OF THE DISCLOSURE

The present disclosure generally relates to networking systems and methods. More particularly, the present disclosure relates to systems and methods for performing convergence in a section of a network having a ring topology using Label Distribution Protocol (LDP).

BACKGROUND OF THE DISCLOSURE

In a network environment, the topology (or architecture) of a subnet (or section of a network) is a collection of information regarding the nodes (e.g., routers, switches, etc.) that currently exist in the subnet as well as the available links that are being used to interconnect the nodes. It should be understood that knowledge of this topology is needed before routes or paths can be planned through the subnet for transmitting packets. Thus, a "discovery" process may be used for determining the present network topology. Discovery may include steps whereby each of the nodes shares its own information with the other nodes as well as its current knowledge of the other nodes and links within the subnet. This discovery process, in some cases, may lead to "convergence," which refers to a state where all of the nodes share the same topological information and therefore agree with one another regarding the actual state of the subnet regarding what nodes are present in the subnet and how they are connected. Once convergence is achieved, it is possible to route packets through the subnet as needed. For example, Interior Gateway Protocol (IGP) is a routing protocol that relies on convergence within the subnet in order to operate properly.

It may also be noted that the topology of a subnet may change over time, which essentially breaks the convergence temporarily until it can be re-established with the latest information. For example, if one or more nodes or links are added or removed from a subnet, additional discovery processes may be needed to achieve convergence again. Also, if it is determined that one or more links include a fault or is unavailable for any other reason, then this information may be communicated throughout the subnet to achieve convergence.

Currently, there are a number of conventional techniques for performing convergence. For example, some of these techniques include Prefix-Independent Convergence (PIC), Loop-Free Alternate (LFA), Remote LFA (RLFA), Topology-Independent LFA (TI-LFA), etc. Some conventional techniques may also include micro-loop avoidance solutions in order to avoid micro-loops in the subnet.

However, the conventional solutions are typically overly complex and cannot be supported by Application-Specific Integrated Circuits (ASICs). Therefore, there is a need in the field of performing convergence in a subnet (or other specifically defined section of a network) in a manner that simplifies the process, avoids the complexity of conventional solutions, and provides fast and efficient convergence, particularly in a subnet where one or more rings are present.

BRIEF SUMMARY OF THE DISCLOSURE

In various embodiments, the present disclosure includes a method having steps, a system including at least one processor and memory with instructions that, when executed, cause the at least one processor to implement the steps, a node in a network configured to implement the steps, and a non-transitory computer-readable medium having instructions stored thereon for programming at least one processor to perform the steps. The steps include performing a convergence procedure to discover the topology of a network in which multiple nodes are arranged; and, upon determining that the topology of the network is a ring topology whereby the node is connected to two neighboring nodes by a respective link, creating a first table for a first link, the first table including labels representing at least a portion of a label stack for allowing the node to transmit packets to another node in the network in an clockwise (CW) direction around the ring; and creating a second table for a second link, the second table including labels representing at least a portion of a label stack for allowing the node to transmit packets to another node in the network in an anti-clockwise (ACW) direction around the ring.

The first and second tables can be created while performing the convergence procedure. The steps can further include utilizing the first table when packets are received over the first link connected to a first neighboring node oriented in the ACW direction from the node; and utilizing the second table when packets are received over the second link connected to a second neighboring node oriented in the CW direction from the node. The steps can further include detecting when one of the first link and the second link is unavailable, and restart a new convergence procedure based on the unavailable and replace the label stack corresponding with one table of the first and second tables to the label stack corresponding with the other table of the first and second tables.

The convergence procedure can include Label Distribution Protocol (LDP) and allows the node to share its prefix with the other nodes of the network to be allocated in the first and second tables of the other nodes of the network. The steps can further include upon determining that the topology of the network includes multiple rings, creating one or more additional tables for the node configured in two or more of the multiple rings. The steps can further include communicating information regarding a preferred ring of the multiple rings and a preferred direction of the CW and ACW directions. The first and second tables can be Multiprotocol Label Switching (MPLS) tables configured to define Label Switched Paths (LSPs). The first and second tables can be configured on Layer 3 for the transmission of Internet Protocol (IP) packets. The first and second tables can be created without using a Ring Protection Link (RPL).

According to other embodiments, the present disclosure is directed to systems, methods, and nodes configured to perform a direction reversal procedure. In one implementation, a process (e.g., executed by each participating node in a ring) may include the step of discovering a first peer node arranged in a first direction around the ring with respect to the node. The process may further include the step of discovering a second peer node arranged in a second direction around the ring with respect to the node. Upon determining that data packets are propagating in the first direction and communication with the first peer node is interrupted, the process may further include the step of performing the direction reversal procedure to propagate the data packets in the second direction. In response to the second peer node being unable to perform the direction reversal procedure, the process may include the step of tunnelling the data packets to a next node in the second direction to thereby bypass the second peer node.

BRIEF DESCRIPTION OF THE DRAWINGS

The present disclosure is illustrated and described herein with reference to the various drawings, in which like reference numbers are used to denote like system components/ method steps, as appropriate, and in which:

FIG. 10 is a flow diagram illustrating a process executable by participating nodes in a network having a ring topology for performing a direction reversal procedure, according to various embodiments.

DETAILED DESCRIPTION OF THE DISCLOSURE

In various embodiments, the present disclosure relates to systems and methods for performing discovery steps to achieve convergence in a subnet or other defined section of a communications network. The present disclosure is specifically configured to simplify convergence in a network (or subnet) having a ring topology where three or more nodes are connected by suitable links in a loop. In some embodiments, the present disclosure may refer to subnets where there is a single ring or loop, whereby other embodiments may refer to subnets having two or more rings or loops. The rings may be configured according to ITU G.8032—Ethernet Ring Protection Switching, whereby version 1 refers to single ring topology and version 2 refers to multiple ring (or ladder) topology.

Normally, convergence may be associated with Layer 2 (i.e., the data link layer) of the Open Systems Interconnection (OSI) model regarding the transmission of Ethernet frames. However, according to some embodiments of the present disclosure, convergence may be associated with Layer 3 (i.e., the network layer) convergence regarding IP packets.

Figure 1:
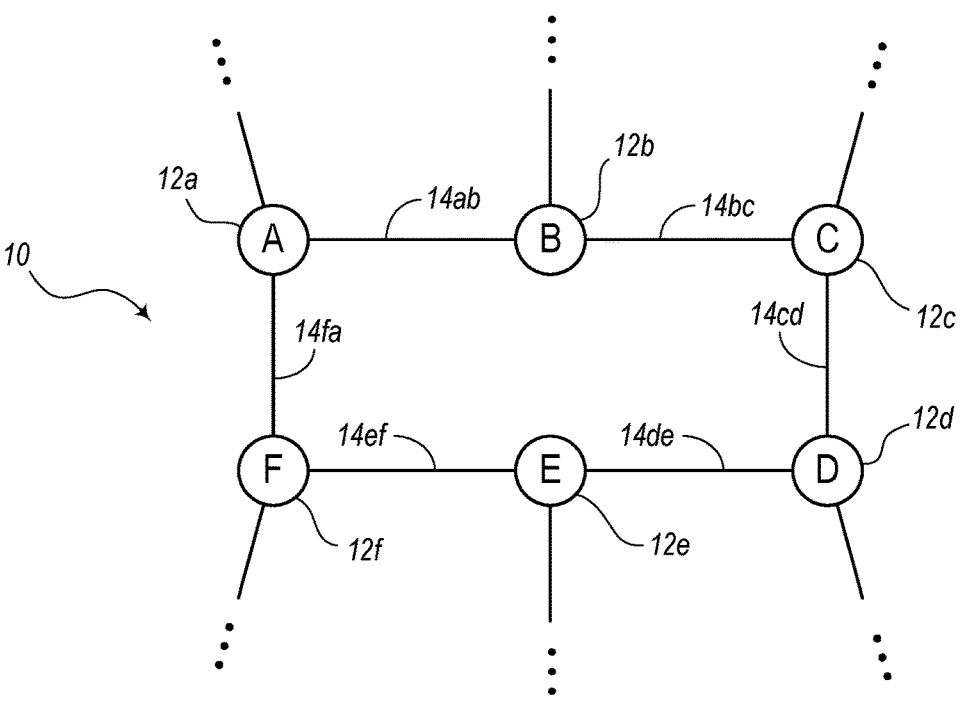
FIG. 1 is a diagram illustrating a section of a network where the nodes are arranged in a ring topology, according to various embodiments.

The systems and methods of the present disclosure are configured for creating convergence in networks (or subnets) having a ring topology and are configured to eliminate the need for complex implementations, such as conventional fast convergence mechanisms (e.g., Prefix-Independent Convergence (PIC), Loop-Free Alternate (LFA), Remote LFA (RLFA), Topology-Independent LFA (TI-LFA), etc.) and/or conventional micro-loop avoidance mechanisms. Also, the embodiments of the present disclosure are configured to improve upon the conventional methods to achieve better convergence results without the need for these conventional techniques. In addition, the embodiments of the present disclosure are not limited by the size of the label stack, which is an issue with some conventional platforms that cannot support label stacks larger than three, thereby making it difficult for these conventional platforms to support PIC, LFA, micro-loop avoidance mechanisms, etc.
Single Ring FIG. 1 is a diagram illustrating an embodiment of a subnet 10 (or section of a network) where nodes 12a, 12b, 12c, 12d, 12e, 12f are arranged in a ring topology. For example, nodes 12a, 12b, 12c, 12d, 12e, 12f in the present disclosure may also be referred to as Node A, Node B, Node C, Node D, Node E, and Node F, respectively. For example, the ring topology in this embodiment includes not only the Nodes A, B, C, D, E, F, but also links 14ab, 14bc, 14cd, 14de, 14ef, 14fa connecting the nodes 12 in a loop. It may be noted, for example that link 14ab is configured to connect Nodes A and B to enable bidirectional communication between these nodes 12 (i.e., node 12a and 12b). Link 14bc is configured to connect Nodes B and C, link 14cd is configured to connect Nodes C and D, and so on. The links 14, for example, may be referred to or may be configured as interfaces, fibers, fiber optic cables, lines, connectors, etc. The topology of FIG. 1 may be defined as a Fixed Telecom Network (FTN), where communication includes physically connected (non-wireless) components.

In addition to the connection to links 14 within the ring, each of the Nodes A, B, C, D, E, F may also be connected to end user devices, servers, edge devices, other subnets, Border Gateway Protocol (BGP) devices or networks, etc. In the examples described in the present disclosure, particularly with respect to communications between peer Nodes A and E, it should be noted that an end user device connected to Node A may attempt to communicate with a server connected to Node E, for example.

When the nodes 12 and links 14 in the subnet 10 are operating properly (e.g., when there are no faults, no disconnections, etc.), then it may be understood that any node 12 may communicate with any other node 12 in the subnet 10 in either a clockwise (CW) direction around the ring or an anti-clockwise (ACW) or counterclockwise direction. According to embodiments whereby the link cost of each link 14 is the same, it may be noted that communication between node 12a and node 12d can be directed in either the CW direction (i.e., A-B-C-D) or ACW direction (i.e., A-F-E-D) with essentially the same cost and same number of hops. Also, for communication from node 12a to either of nodes 12b, 12c, it may be more efficient to route packets in the CW direction, and communication from node 12a to either of nodes 12f, 12e may be more efficient in the ACW direction. Note, as described herein CW and ACW are meant as logical representations of directions associated with the ring meaning each represents a flow in a separate direction from the other around the ring. These are not meant to be exact, meaning in some embodiments, ACW could physically be clockwise and vice versa for CW being anticlockwise. Stated differently, CW is a first direction around the ring and ACW is a second, opposite direction around the ring.

When convergence is achieved within the subnet 10 and all the links 14 are available for packet transmission according to a routing plan, then the subnet 10 is configured to operate normally. In the embodiment of FIG. 1, whereby the subnet 10 includes a ring topology, convergence will reveal the fact that the subnet 10 includes the nodes 12*a*, 12*b*, 12*c*, 12*d*, 12*e*, 12*f* connected in a ring. For example, convergence may include the sharing of prefix information or address information of each of the nodes 12 and how each node 12 is connected to two other adjacent nodes 12, where one adjacent node 12 is oriented in a CW perspective in the ring and the other adjacent node 12 is oriented in a ACW perspective in the ring. For communication to a destination node, a source node is configured to use a destination prefix (associated with the destination prefix) to instruct any intermediate nodes to transmit the packets in a consistent direction (CW or ACW) until the packets reach the destination node.

Figure 2:
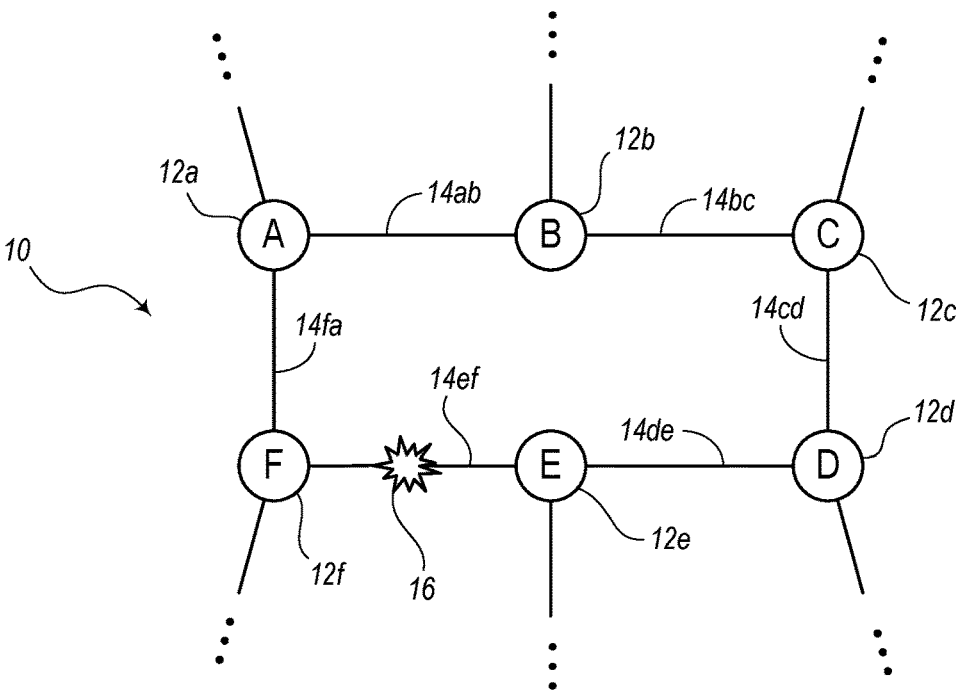
FIG. 2 is a diagram illustrating the section of the network of FIG. 1 where a link interconnecting two nodes is unavailable, according to various embodiments.

FIG. 2 is a diagram illustrating an embodiment where the subnet 10 of FIG. 1 includes a condition where one of the links (i.e., link 14*ef* between Nodes E and F) is unavailable. For example, the link 14*ef* may be unavailable due to various condition 16, such as a break in the link 14*ef*, the link 14*ef* experiencing a large amount of traffic, the link 14*ef* being disconnected from a port associated with Node E or Node F, etc. As a result, it may be beneficial in this case to avoid the process of attempting communication along this link 14*ef*. For example, if Node F intends to transmit packets to Node E but is also aware that link 14*ef* is down, then instead of Node F sending the packets in the ACW direction directly to Node E, Node F will instead send the packets to Node E in the CW direction through intermediate nodes 12*a*, 12*b*, 12*c*, 12*d*, thereby re-routing the packets around the ring in the opposite direction.

Any destination prefix is reachable on any node 12 via an adjacent CW or ACW link 14 or interface. When sending packets labeled for communication to a destination node 12 in either the CW or ACW direction, a Multiprotocol Label Switching (MPLS) label advertised by the CW or ACW node may be used.

Label Distribution Protocol (LDP) may be implemented in an unsolicited downstream manner. In this case, LDP can enable each node 12 to learn the two labels from both of its immediate neighbors or peers (e.g., adjacent nodes) on the ring, wherein the labels may include the associated prefixes or addresses. Also, LDP may include the discovery whereby each node is able to learn the prefixes of other nodes that are not immediately connected. In this case, the prefixes can be passed around the ring (in both directions) to allow each node to learn the prefixes of all nodes in the ring.

LDP is a protocol in which nodes 12 (or routers) are capable of MPLS communication to exchange label mapping information. Any two nodes 12 in the ring, referred to as LDP peers, can establish a session and exchange information bi-directionally between the LDP peers. Also, in the embodiments of the present disclosure with the ring topology, the LDP peers can also exchange information in both the CW and ACW directions. In this way, the LDP peers can obtain relevant information around the entire ring and share this information with the other nodes 12. Tables can be built and maintained to include a database of Label Switched Paths (LSPs) that can be used to forward traffic through MPLS networks (e.g., subnet 10). Each node in the ring will allocate a label for each reachable destination node/router and distribute that to the neighboring routers in the ring, each node will build 2 or more MPLS tables, one for each interface that is part of one or more rings in.

Also, based on the link 14 from which packets are received, a node 12 is configured to utilize the appropriate MPLS table for continuing transmission in the same direction (if possible). As an example, if Node A receives packets from Node B along link 14*ab*, Node A is configured to determine that the packets are received on a specific port connected to the link 14*ab*. By knowing that Node B is oriented in a CW perspective with respect to Node A and the packets are routed in a ACW direction, Node A is configured to use the ACW table (for interface associated with incoming traffic on link AB) for continuing transmission in the ACW direction. For example, Node A in this case is configured to forward the packets to the neighboring node (i.e., Node F).

According to another example, suppose Node A attempts to reach Node E (and assume again that the link costs of all links 14 are equal), the ACW links 14*fa* and 14*ef* would normally be used when there are no failures along this path. To create the ACW table, whereby Nodes A and E are configured as "peer" node attempting to establish a route. In this case, Node A allocates label A (for prefix of Node E) NODE E and is configured to learn label F (for Node E) from Node F and label B (for Node E) from Node B.

It may be noted that the last entry in the bottom row of each table include the same prefix or label as the node itself on which this information in stored. This extra entry may be used simply for the discovery process to share information to other nodes, especially since a node typically does not need to loop around the entire ring to return back to itself. Thus, in some embodiments, the last row of entries may be omitted from the tables.

Node B may be configured to allocate (or program) label B (for prefix Node E) and learn label A (for Node E) from Node A and label C (for Node E) from Node C. Node C may be configured to allocate label C (for prefix Node E) and learn label D (for Node E) from Node D and label B (for Node E) from Node B. Node D is configured to allocate label D (for prefix Node E) and learn label E (for Node E) from Node E and label C (for Node E) from Node C. Node E may be configured to allocate label E for prefix Node E, which may be an implicit NULL. Node F may be configured to allocate label F (for prefix Node E) and learn label E (for Node E) from Node E and label A (for Node E) from Node A. Node F (in the FTN topology) for Node E may include a primary path via Node E (using label E) and a backup path via Node A (using label A).

Node A may be configured to allocate (or program) incoming label A in the two MPLS tables. The "Node A" portion of the first MPLS table (for use by Node A) is configured for receiving packets along the link 14*ab* (from Node B) and the "Node A" portion of the second MPLS table (for use by Node A) is configured for receiving packets along the link 14*fa* (from Node F). In the first MPLS table, incoming label A is configured to point to the next hop to Node F (using label F). In the second MPLS table, incoming label A is configured to point to the next hop to Node B (using label B).

Between any two nodes 12 in the ring, the embodiments of the present disclosure may use a Link Aggregation Group (LAG) or parallel Layer 3 links or interfaces. If more than one Layer 3 link connects two nodes, then the MPLS table may be associated with the links in the CW direction and the second MPLS table may be associated with links in the ACW direction.

Referring again to FIG. 2, suppose Node A is attempting to reach Node E and the link 14ef includes a fault 16 or other condition making the link 14ef unavailable or impractical. When the link 14ef goes down, Node F may be configured to trigger protection on the subnet 10 and immediately send the packet back to Node A with label A on the CW link (i.e., link 14fa) prior to Node A detecting the topology change and converging. Node A is configured to receive the information of the second MPLS table from the direction of the link 14fa and is configured to look up the MPLS packet in the table associated with MPLS table to send the packet in the CW direction towards Node B. Then, Node B is configured to receive the MPLS packet on link 14ab (or interface), look up the MPLS packet in the table associated with link 14ab, and send the packet in the CW direction towards Node C, and so on.

In the case where the link 14ef is restored and packets can be transmitted between Nodes E and F, the nodes again are configured to perform convergence to relearn the restored subnet 10. The condition of the subnet 10 shown in FIG. 1 may therefore be considered to be relevant.

In the "link up" case, any destination prefix may be reachable on any router via CW or ACW links or interfaces. When sending the packets labeled to any destination clockwise or anti-clockwise, the MPLS labels advertised by the CW or ACW node may be used. When link 14ef was down (prior to the link 14ef being "up" or restored), Node A would utilize links 14ab, 14bc, 14cd, and 14de to reach Node E, which of course bypasses the faulty link and proceeds around the ring in the opposite direction from the "preferred" direction. Then, when the link 14ef is up, the nodes may converge on the newly restored topology, which may occur in any order. Any node receiving packets in the CW or ACW directions can look up the packet in the correct MPLS table associated with the link from which the packets were received. In some embodiments, the nodes 12 may forward the packet clockwise until the packet reaches the destination node on the ring.

Again, each node 12 in the ring is configured to allocate or program the two MPLS tables. The CW table is used when packets are received clockwise and the ACW table is used when packets are received anti-clockwise. Based on the labels in the tables, the nodes are configured to continue transmitting the packets in the same CW or ACW direction around the ring as they are received until the destination is reached.

Corresponding portions of the two MPLS tables will be populated on all the respective nodes with the same MPLS incoming labels. However, in the first table (clockwise table), the ingress labels will be pointing in the CW direction in order to direct the route toward the next CW hop link, and whereby the second table (anti-clockwise table) includes the ingress labels pointing in the ACW direction to direct the route toward the next ACW hop link. If packets arrive over the ACW link, then the ACW table is used. If packets arrive over the CW link, then the CW table is used. The MPLS tables may be programmed with the best Interior Gateway Protocol (IGP) path and label as the primary path and with a backup pointing in the opposite direction for the next hop.

Multiple Rings

Figure 3:
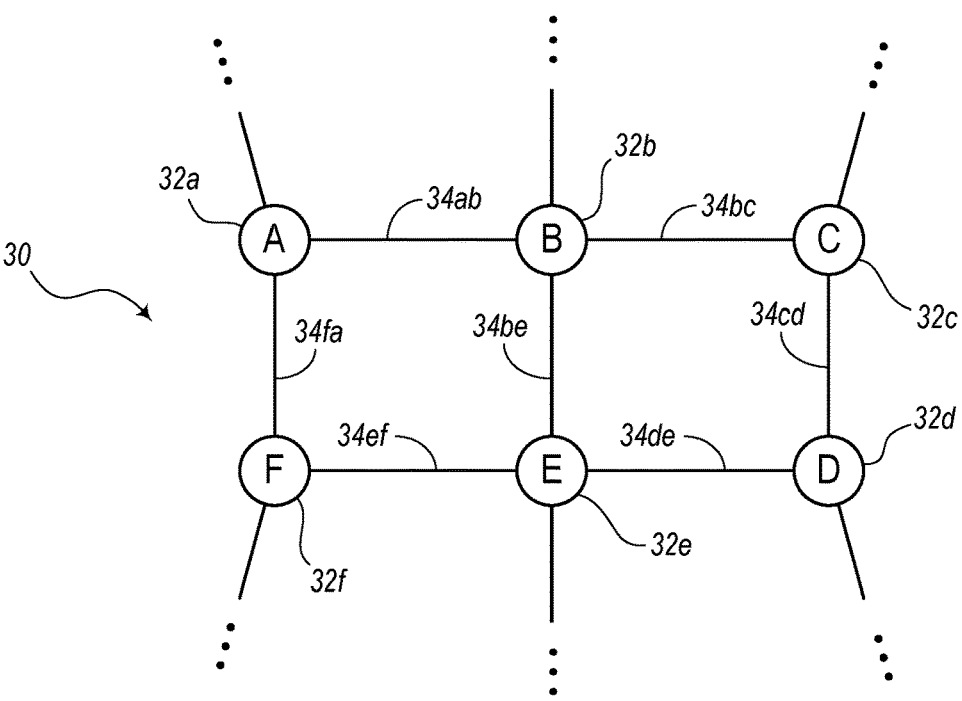
FIG. 3 is a diagram illustrating the section of the network of FIG. 1 where the nodes are arranged in a topology having two rings, according to various embodiments.

FIG. 3 is a diagram illustrating an embodiment of another subnet 30, similar to the subnet 10 shown in FIGS. 1 and 2. In this embodiment, the subnet 30 includes nodes 32a, 32b,

32c, 32d, 32e, 32f (i.e., Nodes A, B, C, D, E, F) arranged in a topology having two rings. For example, the first ring in this example includes Nodes A, B, E, and F and the second ring in this example includes Nodes B, C, D, and E (plus the third ring including Nodes A, B, C, D, E, and F as described above with respect to FIGS. 1 and 2). It may be noted that Nodes B and E are used for creating both of the first two shorter rings. In particular, to create the two rings with respect to the arrangement shown in FIGS. 1 and 2, the subnet 30 includes an extra link 34be between Nodes B and E. Also, the subnet 30 includes links 34ab, 34bc, 34cd, 34de, 34ef, 34fa, and 34be.

Figure 4:
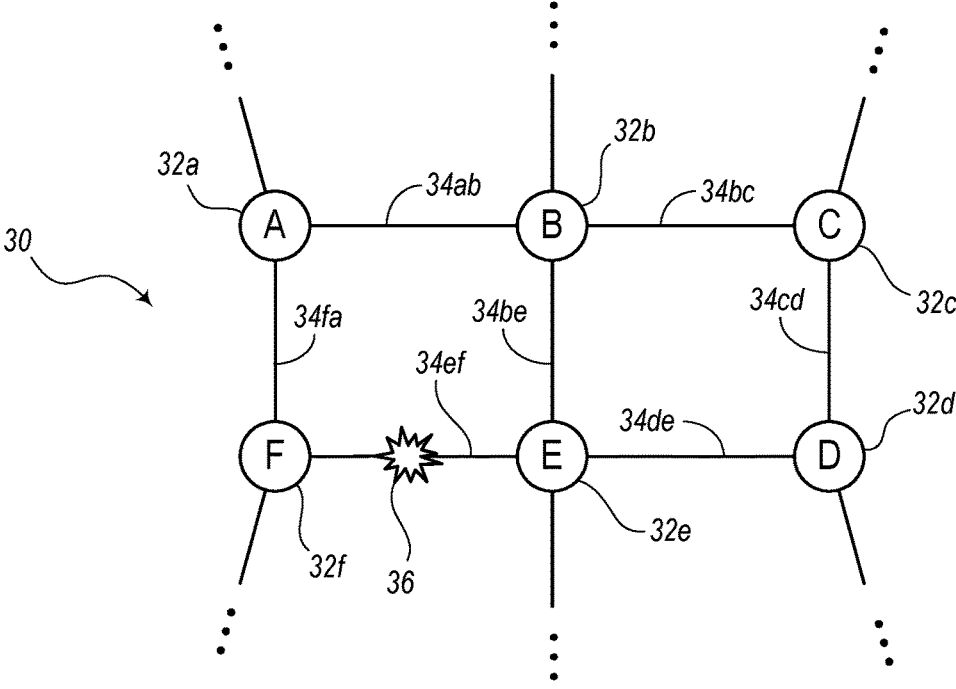
FIG. 4 is a diagram illustrating the section of the network of FIG. 3 where a link interconnecting two nodes is unavailable, according to various embodiments.

FIG. 4 is a diagram of the multiple ring topologies of the subnet 30 of FIG. 3, whereby one of the links (i.e., link 34ef) interconnecting Nodes E and F includes a fault 36 or is unavailable (e.g., faulty, disconnected from a port of Node E, disconnected from a port of Node F, congested because of excessive traffic, etc.). Again, in these examples, the link costs of each of the links 34 may be assumed to be the same.

To reach Node D from Node A, links 34ab, 34bc, 34cd may be used for transmission in the CW direction. This may be the preferred route when there are no faults 36 or failures (as shown in FIG. 4). With LDP downstream unsolicited, Nodes B and E, which participate in more than one ring, will have more than two links 34 associated with rings. In this case, Node B is connected to links 34ab, 34bc, 34be and Node E is connected to links 34de, 34be, 34ef. The nodes 32 are configured to learn labels from neighbors on the rings for all prefixes, similar to the processed described with respect to FIGS. 1-2. However, instead of two tables associated with each node, Nodes B and E (i.e., connected to multiple rings) may be configured to store one MPLS label table per link (or interface) on any ring. In other embodiments, Nodes B and E may include three tables—one per interface connected to the 2 rings.

For example, Node B may be configured to allocate (or program) label B for prefix Node D and also learn label C (for Node D) from node C, label A (for Node D) from Node A, and label E (for Node D) from Node E. Node E may be configured to allocate label E (for prefix Node D) and also learn label F (for Node D) from Node F, label D (for Node D) from Node D, and label B (for Node D) from Node B. In some embodiments, Node F (in the FTN subnet 30), for Node D primary path, via Node E, label E, and backup via Node A, label A.

Node A, which is configured to participate in a single ring in this embodiment, is configured to program incoming label A in the two MPLS tables related to ring 1. The first MPLS table may be used when Node A receives packets on link 34fa and the second MPLS table may be used when Node A receives packets on link 34ab. The first table with incoming label A will point to the next hop of Node B (label B). In some embodiments, a backup path may be included for transmission in the opposite direction with Node F, label F as the next hop. The second MPLS Table has incoming label A and points to next hop Node F (label F). In some embodiments, a backup path may be included for transmission in the opposite direction with Node B, label B as the next hop.

Node B, which is configured to participate in two different rings in this embodiment, may be configured to program incoming label B in three different MPLS tables. In this case, a first table may be used when packets are received on link 34ab, a second table may be used when packets are received on link 34be, and a third table may be used when packets are received on link 34bc. For example, the first table, with incoming label B, may be configured to point to Node E, label E (e.g., with backup Node C, label C). The second table, with incoming label B, may be configured to point to Node C, label C (or to Node A, label A) (e.g., with backup Node A or Node C, respectively). This second table may be based on knowledge of each of the two rings. The third table, with incoming label B, may be configured to point to Node E, label E (e.g., with backup Node A, label A).

In other embodiments, Node B may include three MPLS tables for directing where the packets are traveling and further based on the incoming interface and the ring on which the packets are traveling. Similarly, Node E, which participate in the two rings, may have three tables depending on which link 34*be*, 34*de*, 34*ef* packets are traveling.

Referring again to FIG. 4, when the fault 36 is detected on link 34*ef* (or when other condition occurs that prevents packets from being adequately transmitted between Nodes E and F), alternate paths may be used, depending on reversing the direction around the same ring and/or by utilizing the other ring, as needed to properly reach the intended destination.

If link 34*ef* goes down (e.g., due to fault 36), Node F may trigger a protection path and immediately send a packet intended for Node E back to Node A with label A on the link 34*fa* (or interface) prior to Node A detecting the topology change (e.g., due to the fault 36) and converging. Node A receives the MPLS packet on the link 34*fa*, looks up the next hop on the MPLS table associated with link 34*fa* and finds (i.e., label B) and sends the packet to Node B. Node B receives the MPLS packet on link 34*ab*, looks up the next hop on the table associated with link 34*ab* and sends the packet to Node E. Node E (i.e., the destination node) receives the MPLS packet on link 34*be*. In a situation where there is a fault in a link (e.g., link 34*be*) that is common to two or more different rings, then the systems and methods of the present disclosure may be configured to use backup paths to allow moving from one ring to another.

When the fault 36 is detected on link 34*ef*, Node A may attempt to reach Node E, for example. In this case, transmission may begin in the preferred manner (i.e., ACW to Node F). However, when Node F detects the fault 36, Node F triggers protection and the packets are sent back to Node A in the CW direction and Node A, using the MPLS table associated with link 34*fa* Node A forwards the packets to the next hop Node B, and so on, until the destination node (i.e., Node E) is reached.

When the link 34*ef* recovers from the fault 36 (e.g., the fault 36 is repaired, cables are reconnected, etc.), Node F may discover that link 34*ef* that is available again and begins another LDP process to share topology information, again leading to convergence upon the changed topology (e.g., repaired or restored link 34*ef*). Nodes receiving packets may look up the next hop in the corresponding MPLS tables associated with receiving on a specific link and then and forward the packet in the same direction until the packet reaches the destination node on the ring.

Each node on either of the rings may be configured to allocate or program the MPLS table(s) associated with each link(s) attached to the rings (or alter the tables based on topology changes). The next hops are configured per link on any ring and can be used when packets are received on the respective link or interface. For example, packets received on a link 34 on any ring may be analyzed by the respective node 32, which may then look at the associated MPLS table. If packets are received in the CW or ACW direction, the next nodes 32 on the path are configured to forward in the same direction until the destination is reached. Thus, the MPLS tables are configured to direct the packets in the same direction not to create loops, unless there is a faulty or unavailable link, where, in this case, the detecting node can reverse the direction by switching to the information on the other table for that ring and/or by switching the information to another ring if a link common to multiple rings is down. This process may be performed per ring and per direction. The MPLS tables can be populated for all nodes 32 with the same MPLS incoming labels. However, these incoming labels may be pointing to other links 34 on the rings other than the incoming link 34 associated with the MPLS table. The MPLS tables may be programmed with the best IGP path+label as a primary and with the backup pointing to one of the other interfaces on the rings.

Figure 5:
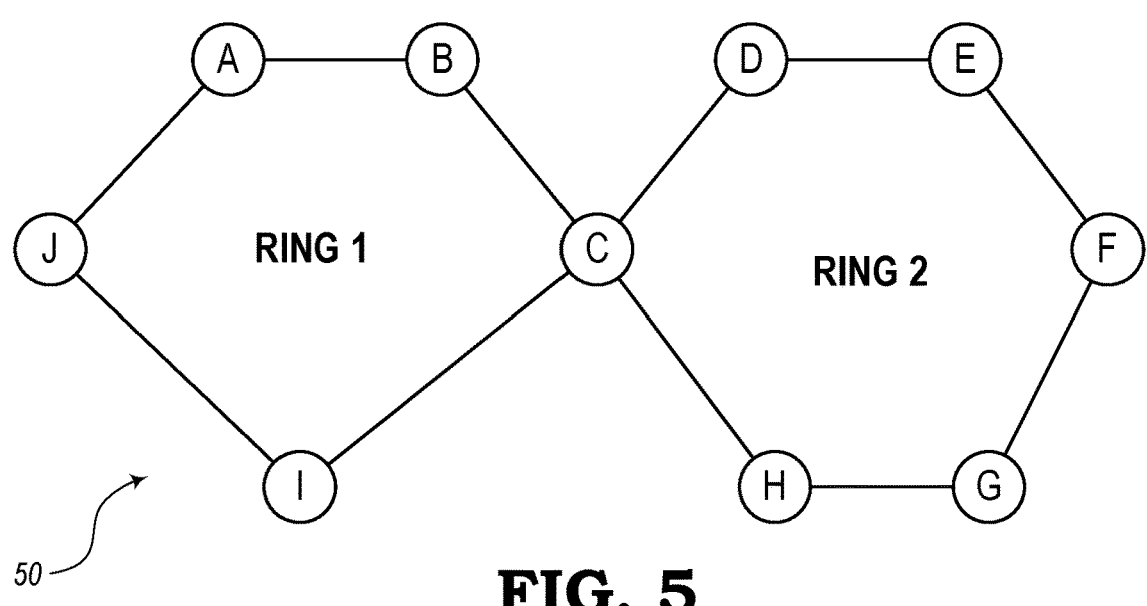
FIG. 5 is a diagram illustrating a section of a network where nodes are arranged in a topology having two rings and where there is no common link between the two rings, according to various embodiments.
Figure 6:
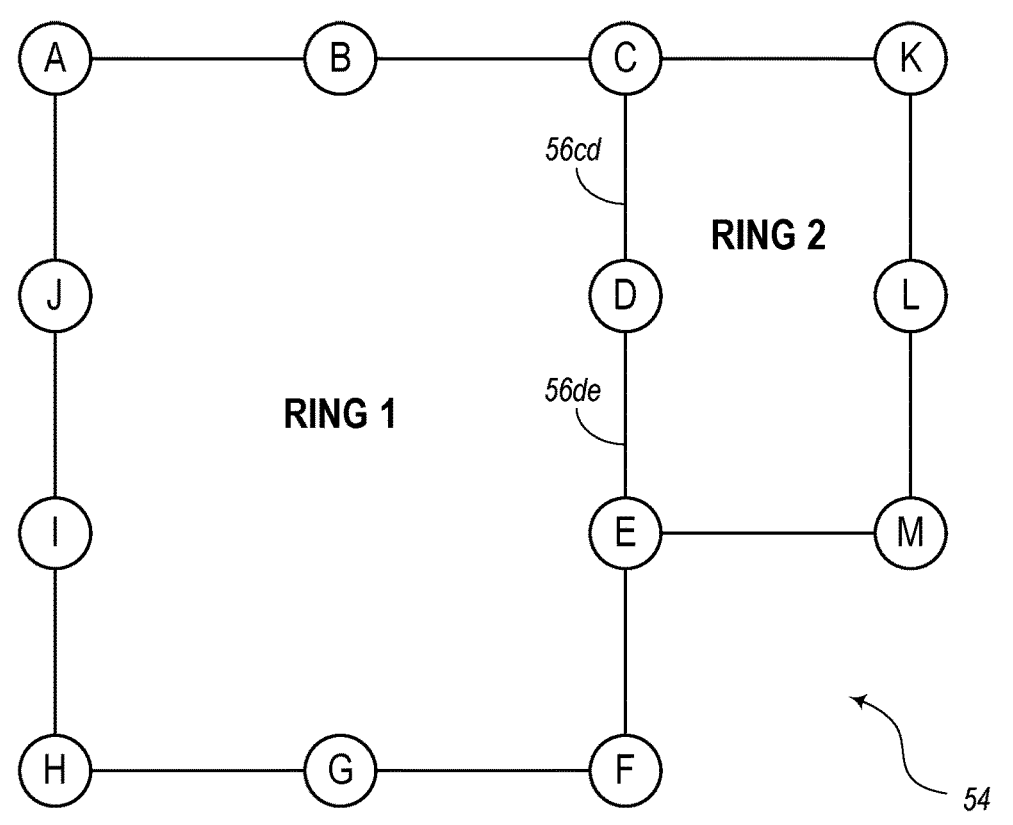
FIG. 6 is a diagram illustrating a section of a network where nodes are arranged in a topology having two rings and where there are two common links between the two rings, according to various embodiments.

FIG. 5 is a diagram illustrating an embodiment of a subnet 50 where nodes are arranged in a topology having two rings. However, in contrast to FIGS. 3 and 4, there is no common link (e.g., link 34*be*) in the subnet 50. It should be noted that MPLS tables may be created in a comparable manner for determining next hop information for each node based on the ring (or rings) in which the packets are being transmitted and the CW and/or ACW direction around the rings in which the packets are being transmitted. Also, FIG. 6 is a diagram illustrating an embodiment of a subnet 54 where nodes are arranged in a topology having two rings. However, in this embodiment, there may be two links 56*cd*, 56*de* used by both rings. Therefore, the transmission from Node C to Node D along link 56*cd* may be in a CW direction when associated with ring 1 or may be in an ACW direction when associated with ring 2.

General Systems and Methods

Figure 7:
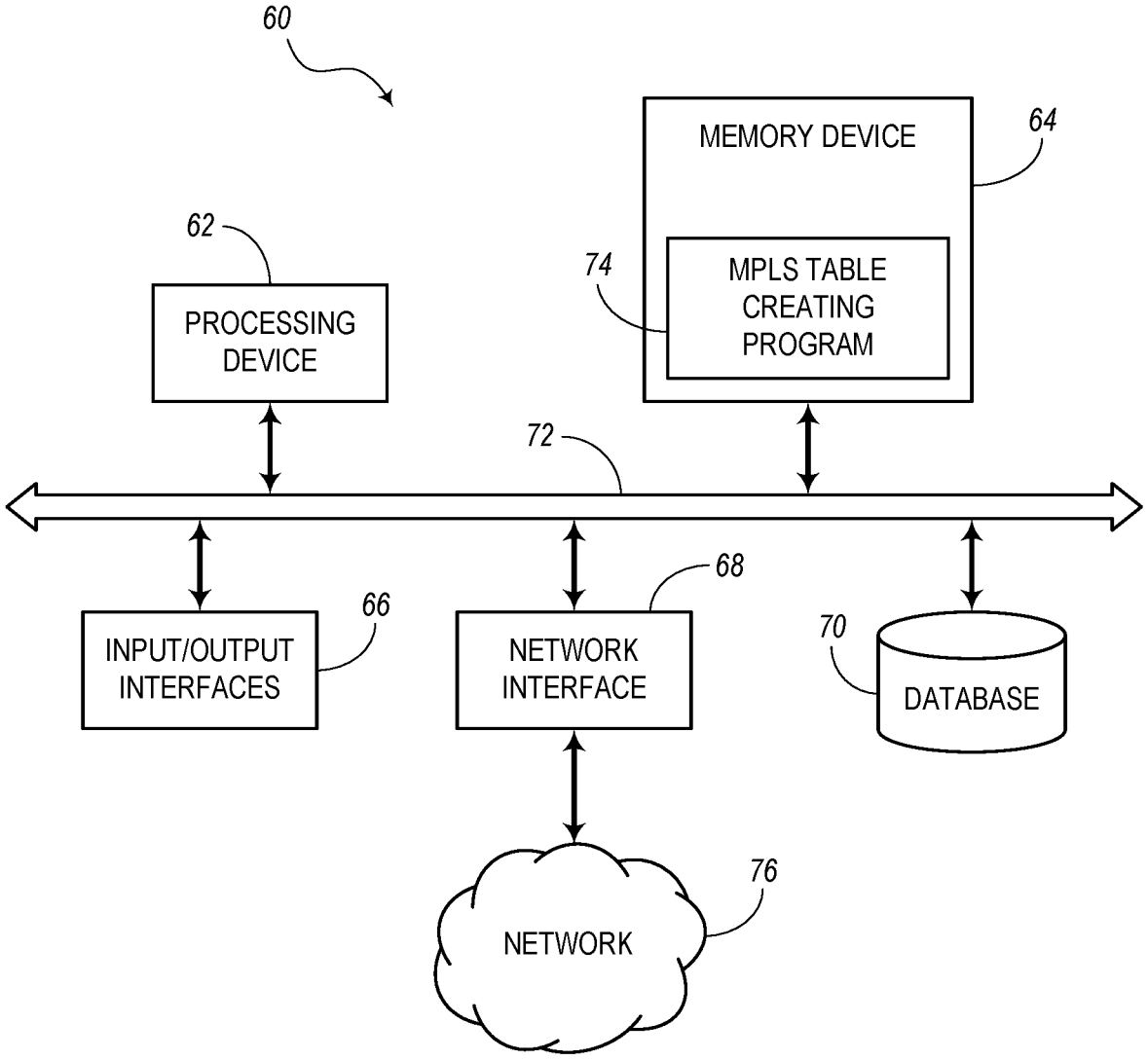
FIG. 7 is a diagram illustrating a computing system for creating MPLS tables, according to various embodiments.

FIG. 7 is a diagram illustrating a computing system 60 for creating MPLS tables in a discovery or convergence strategy. The computing system 60, as illustrated, may include a processing device 62, memory device 64, input/output interfaces 66, network interface 68, and a database 70, each interconnected via a local interface 72. The network interface 68 may be configured for communicating with a network 76 or subnet (e.g., subnet 10, 30, 50, 54) for communicating information used to create MPLS tables. This can be achieved during a discovery stage or when the network 76 changes (e.g., due to a faulty or unavailable link). In some embodiments, the computing system 60 may represent each of the nodes (e.g., nodes 12, 32, etc.) in the network or subnet for performing convergence and for assisting with the creation of the MPLS tables. In other embodiments, the computing system 60 may be a control system for managing the nodes 12, 32 to create and distribute MPLS tables.

In some embodiments, the computing system 60 may include an MPLS table creating program 74 configured to gather information regarding the discovered topology of the network 76 (or subnet). The tables are created for storage on each respective node such that the next hop can be configured into a label stack or the like. Thus, the created tables may represent the currently determined topology and can be used to instruct the respective node to transmit packets based on a ring being used (if more than one ring is present in the topology) and also based on the continuing direction (CW or ACW) in which the packets are being transmitted. The MPLS table creating program 74 may be configured in any suitable combination of hardware (e.g., in the processing device 62) and software/firmware (e.g., in the memory device 64). Functionality of the computing system 60 may be associated with the process 80 described below with respect to FIG. 10.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, at least one processor, circuit/circuitry, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Figure 8:
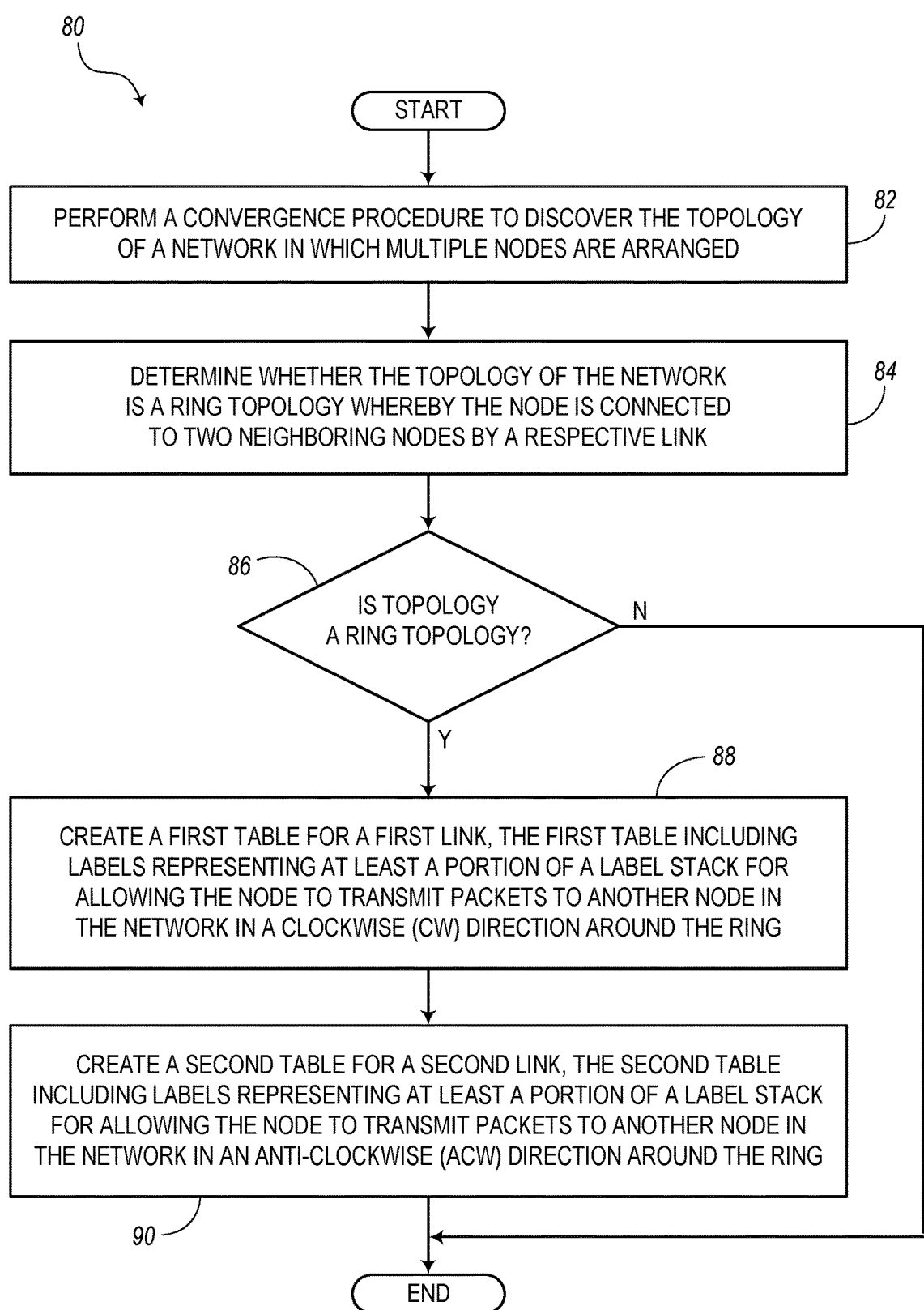
FIG. 8 is a flow diagram illustrating a process for creating MPLS tables in a network topology having one or more rings, according to various embodiments.

FIG. 8 is a flow diagram illustrating an embodiment of a process 80 for creating MPLS tables in a network topology having one or more rings. The process 80 can be realized as a method or via a node operating in the network. The process 80 includes performing a convergence procedure to discover the topology of a network in which multiple nodes are arranged (step 82); and upon determining (steps 84, 86) that the topology of the network is a ring topology whereby the node is connected to two neighboring nodes by a respective link, creating a first table for a first link, the first table including labels representing at least a portion of a label stack for allowing the node to forward received packets to another node in the network in a clockwise (CW) direction around the ring (step 88); and creating a second table for a second link, the second table including labels representing at least a portion of a label stack for allowing the node to forward received packets to another node in the network in an anti-clockwise (ACW) direction around the ring (step 90).

The first and second tables can be created while performing the convergence procedure. The process 80 can further include utilizing the first table when packets are received over the first link connected to a first neighboring node oriented in the CW direction from the node; and utilizing the second table when packets are received over the second link connected to a second neighboring node oriented in the ACW direction from the node. The process 80 can further include detecting when one of the first link and the second link is unavailable, and restart a new convergence procedure based on the unavailable link and replace the label stack corresponding with one table of the first and second tables to the label stack corresponding with the other table of the first and second tables.

The convergence procedure can include Label Distribution Protocol (LDP) and allows the node to share its prefix with the other nodes of the network to be allocated in the first and second tables of the other nodes of the network.

The process 80 can further include upon determining that the topology of the network includes multiple rings, creating one or more additional tables for the node configured in two or more of the multiple rings. The process 80 can further include communicating information regarding a preferred ring of the multiple rings and a preferred direction of the CW and ACW directions. The first and second tables can be Multiprotocol Label Switching (MPLS) tables configured to define Label Switched Paths (LSPs). The first and second tables can be configured on Layer 3 for the transmission of Internet Protocol (IP) packets. The first and second tables can be created without using a Ring Protection Link (RPL).

Therefore, various embodiments of the present disclosure are discussed for creating MPLS tables used for instructing nodes to transmit packets in either the CW or ACW directions around a ring. Using the embodiments of the present disclosure, certain benefits may result. For example, the systems and methods may be able to achieve a superior network convergence and micro loop avoidance with a simple implementation with to networks with ring topologies. Also, it is possible to eliminate the need for conventional fast convergence mechanisms such as PIC, LFA, RLFA, TI-LFA, etc. Also, it is possible to eliminate need for any conventional micro loop avoidance mechanisms. Thus, the present disclosure provides a much simpler implementation for fast convergence and loop avoidance mechanisms. Also, the present embodiments are not limited by the size or length of the label stack, which can be a problem with certain conventional systems.

Bypassing Non-Participating Nodes

It may be noted that the "direction reversal procedure" (e.g., MPLS table creating program 74) described above with respect to the embodiments of FIGS. 1-8 may be capable of operating in a network or subnetwork in which all the nodes are onboard with the concept of reversing the direction around a ring to avoid unavailable links. Thus, in an ideal scenario in which all the nodes are equipped with logic associated with the direction reversal procedure and are capable of understanding that the direction of data packet transmission may be reversed as needed, then operation may proceed normally. However, in many networks, one or more nodes may not be equipped with (or may be incapable of) the direction reversal procedure described herein.

As such, the following embodiments may further include steps for "bypassing" those nodes that do not understand the direction reversal procedure. For example, some nodes may include equipment provided by different vendors that are not particularly designed with the processes or protocols related to reversing directions around a ring. In some cases, one or more nodes may be provided by the same vendor, but may not be updated or upgraded to be able to perform (or understand) the direction reversal procedure. Regardless of the reasons that one or more nodes may not be equipped with the direction reversal procedure, the following embodiments are configured to establish tunnels (or other suitable routes)

to bypass those nodes that do not participate in the direction reversal procedure of the present disclosure.

As described above, the embodiments of the present disclosure are configured to simplify Layer 3 convergence in a network having a ring topology. The systems and methods of the present disclosure are configured to eliminate the need for complex convergence and routing implementations, such as fast convergence techniques (e.g., PIC, LFA, RLFA, TI-LFA, etc.), micro loop avoidance, etc. Again, the examples described herein may assume equal-cost paths or links to simplify the discussion. However, it should be noted that calculating paths based on costs can be performed in parallel with the procedures described herein and may include any suitable systems and methods in this regard.

In addition to regular convergence procedures for discovering the topology of a network, convergence steps may further include determining which ones of the nodes in a ring are capable of performing the direction reversal procedure. For example, in one embodiment, the participating nodes may be configured to set a flag that can be communicated to other nodes in the network to allow the participating nodes to understand which nodes can perform the direction reversal procedures and those that cannot. Thus, convergence may also include establishing one or more tunnels for bypassing one or more non-participating nodes.

For example, referring again to FIGS. 3 and 4, assume that Node B is a participating node and is capable of the direction reversal procedure. Also, as mentioned above, Node B is part of a first ring including Nodes A, B, E, and F and a second ring including Nodes B, C, D, and E. Furthermore, in some embodiments, Node B may also be considered as part of a third ring including Nodes A, B, C, D, E, and F. Thus, with respect to the first ring, Node B has two peer nodes (i.e., Nodes A and E). With respect to the second ring, Node B again has two peer nodes (i.e., Nodes C and E). With respect to the third ring (if used), Node B again has two peer nodes (i.e., Nodes A and C). It may be noted, therefore, that Node B has a different pair of peer nodes for each ring.

For each of the three rings, Node B may be configured, as part of its participation in the direction reversal procedure, to perform convergence to discover these peer nodes and also to determine whether these peer nodes are equipped to also perform the direction reversal procedure. From the perspective of Node B, if any of the peer nodes (i.e., Nodes A, C, E) is unable to perform the direction reversal, then tunnels can be established or created to bypass these nodes in the event that the transmission direction is actually reversed. The reason for bypassing non-participating nodes is that, since the non-participating node might not know how to handle a packet propagating in the reversed direction, the node might return the packet back to the sender (i.e., Node B) with an error message and not continue forwarding the packet in the reversed direction because it would not know to continue propagation in this manner.

In MPLS, a Forwarding Equivalence Class (FEC) is used to describe a set or class of packets having similar characteristics and which can be forwarded in essentially the same way. In some cases, packets in a FEC can be bound to the same MPLS label. A Label Forwarding Information Base (LFIB), which may have similarities to Forwarding Information Base (FIB), is a data plane MPLS forwarding table and can be used to forward MPLS packets. For example, an LFIB can be a routing table stored on a node. The labels in the table can be exchanged between a node and an adjacent or peer node, which may be part of a convergence procedure. One entry in an LFIB table may include a Next Hop Label Forwarding Entry (NHLFE), which defines an operation to be performed by a label and can be used for forwarding MPLS packets.

The LFIB table may also include an FEC-to-NHLFE (FTN) map. The FTN map is configured to link each FEC to a set of NHLFEs at the ingress Label Switched Router (LSR). The FTN map can be used for forwarding unlabeled packets that need MPLS forwarding. When an LSR receives an unlabeled packet, it looks for the corresponding FIB entry. If a token value of the FIB entry is not invalid, the packet is forwarded through MPLS. The LSR can then look for the corresponding NHLFE entry according to the token value to determine the label operation to be performed.

With respect to the embodiment of FIGS. 3 and 4, the FTN associated with Node E the Node F primary path via Node E, Label E and backup via Node A, with two labels in the label stack Label-to-Node-B— Label B. Label-to-Node-B will tunnel packets via Node A to reach Node B, Node E will as well have a target LDP session to Node B used to learn label B.

Figure 9:
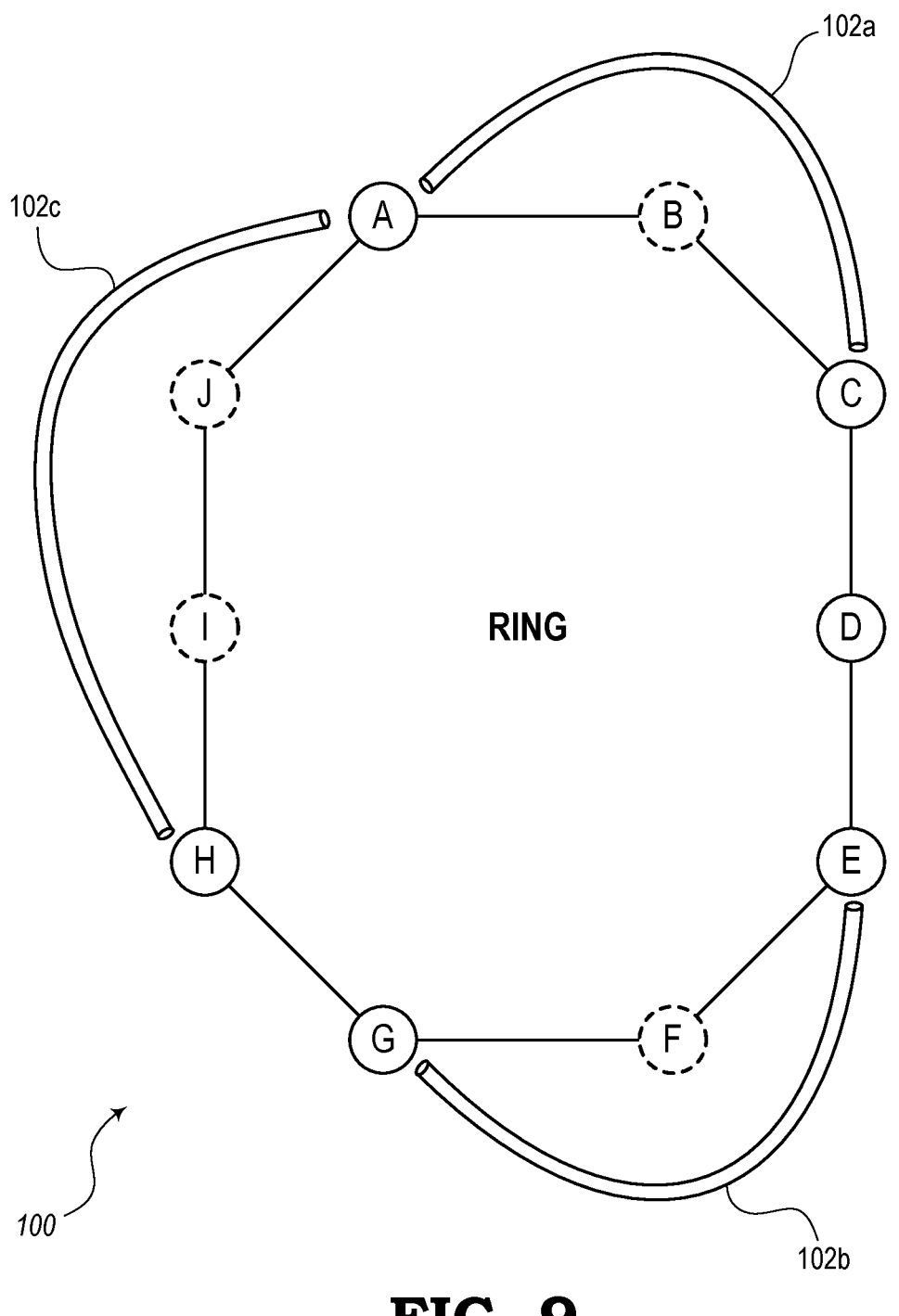
FIG. 9 is a diagram illustrating a section of a network where nodes are arranged in a topology having a ring and where tunnels are established to bypass certain nodes when necessary, according to various embodiments.

FIG. 9 is a diagram illustrating an embodiment of a section of a network 100 where nodes are arranged in a topology having a ring. In particular, Nodes A-J are arranged in a ring. Also, the network 100 includes tunnels 102a, 102b, 102c, which are created or established to bypass certain nodes that are not equipped to participate in the direction reversal procedure described in the present disclosure. For example, when it is determined that Node B is a non-participant, the tunnel 102a is set up to bypass Node B during a direction reversal procedure. Also, when it is determined that Node F is a non-participant, the tunnel 102b is set up to bypass this node during reversal, and when it is determined that Nodes I and J are non-participants, tunnel 102c is set up to bypass these nodes. When transmission is conducted in a forward manner, each node can continue forwarding packets according to normal protocols. However, if an interruption is detected and the direction reversal procedure according to the present disclosure is enacted, then only the participating nodes will be used and the others will be skipped using the tunnels 102.

The following example is related to embodiments from the perspective of Node A shown in FIG. 9. The node (e.g., Node A) may be configured to operate in a network in which multiple nodes (e.g., Nodes A-J) are arranged in a ring. In this embodiment, the node (e.g., Node A) may include circuitry configured to discover a first peer node (e.g., Node B) arranged in a first direction (e.g., CW direction) around a ring with respect to Node A. The circuitry is also configured to discover a second peer node (e.g., Node J) arranged in a second direction (e.g., ACW direction) around the ring with respect to the node. Upon determining that data packets are propagating in the first direction (e.g., CW direction) and communication with the first peer node (e.g., Node B) is interrupted, the circuitry of Node A is configured to perform the "direction reversal procedure" described in the present disclosure. Specifically, the direction reversal includes propagating the data packets in the second (opposite) direction (e.g., the ACW direction). In response to the second peer node (e.g., Node J) being unable to perform the direction reversal procedure, the circuitry of Node A is configured to tunnel the data packets to a next node (e.g., Node I) in the second direction to thereby bypass the second peer node (e.g., Node J).

However, in this example, this next node (i.e., Node I) may also be unable to perform the direction reversal procedure. Therefore, in this case, the tunnel can be established to the next available node capable of performing the direction reversal procedure. For example, the next available node is Node H. Thus, the tunnel 102c is created between Nodes A and H.

Furthermore, upon determining that data packets are propagating in the second direction (e.g., ACW) and communication with the second peer node is interrupted, the circuitry is further configured to perform a direction reversal procedure to propagate the data packets in the first direction (e.g., CW). In response to the first peer node being unable to perform the direction reversal procedure, the circuitry is further configured to tunnel the data packets to a next node (e.g., Node C) in the first direction to thereby bypass the first peer node. In response to the second peer node being unable to perform the direction reversal procedure, the circuitry is further configured to tunnel the data packets to a next available node in the second direction capable of performing the direction reversal procedure.

The circuitry is further configured to perform a convergence procedure, as described above, to discover the first and second peer nodes and to determine that the network includes a ring topology. The convergence procedure may further include a routine of determining which of the multiple nodes are equipped to perform the direction reversal procedure. The convergence procedure may further include a routine of establishing one or more tunnels to bypass one or more nodes that are not equipped to perform the direction reversal procedure. The convergence procedure may include Label Distribution Protocol (LDP) and may allow the node to share its prefix with other nodes of the network for allocation in routing tables associated with the other nodes.

The multiple nodes may be arranged in multiple rings in the network 100, such as is described with respect to FIGS. 3-6. A participating node (e.g., Node B in FIGS. 3 and 4) may be associated with at least two rings. For example, Node B may be associated with first, second, and/or third rings. In some embodiments, the node circuitry may further be configured to discover pairs of peer nodes in the two different directions around each of the at least two rings. Upon determining that data packets are propagating in one direction around one ring and communication with the next peer node is interrupted, the circuitry can perform the direction reversal procedure to propagate the data packets in another direction around the respective ring. Also, the circuitry can tunnel the data packets to a next available node in the other direction to thereby bypass the next peer node when the next peer node is not equipped to perform the direction reversal procedure.

As described with previous embodiments, the node circuitry described in this embodiment may further be configured to use Multiprotocol Label Switching (MPLS) tables configured to define Label Switched Paths (LSPs) for propagating the data packets in the first and second directions around the ring. The node circuitry may further be configured to create a first table for a first link connecting the node to the first peer node. The first table may include labels representing at least a portion of a label stack for allowing the node to transmit data packets to the first peer node in the network. Also, the circuitry may create a second table for a second link connecting the node to the second peer node, where the second table may include labels representing at least a portion of a label stack for allowing the node to transmit data packets to the second peer node.

In some embodiments, Node D (FIG. 3) may trigger protection on FTN and immediately send the packet back to Node A with a two label stack Label-to-Node-B as top label, Label B as bottom label on link 34fa prior to Node A detecting the topology change and converging. Node A is configured to receive MPLS packet on Rx interface or link 34fa Lookup Label-to-Node-B in the single MPLS table, and send the packet to Node B.

Any node receiving packets in the CW or ACW direction looks up the packet in the correct MPLS table associated with the link or Rx interface and forwards the packet CW or ACW until the packet reaches the destination node on the ring. If any node along the ring is not prepared for direction reversal strategies described herein can be bypassed by tunneling the packet through it to the next node on the ring that understands the strategies.

In some embodiments, the discovery of which nodes are capable to support direction reversal procedure may be implemented in any suitable new or existing protocol. For example, the node capability information for support of direction reversal strategies may be included in a protocol, such as Interior Gateway Protocol (IGP) and/or Border Gateway Protocol (BGP), and/or in an extension to these protocols. With this capability, participating nodes in a network or subnet may be able to discover which nodes in the ring support the present mechanisms and which nodes do not. Also, targeted Identity Provider (IDP) sessions may be set up to nodes who support the strategies across heterogenous nodes that are directly connected and do not support the reversal strategies.

In some embodiments, the nodes equipped with the direction reversal procedure may program the data plane to use additional labels for tunneling purposes to bypass nodes that are non-participants. This can apply to both working and protection paths. In the data plane, the participating nodes may use the tunneling technique to bypass the nodes that do not support the extensions defined herein, for both working and protection paths.

The direction reversal procedure described by the embodiments in the present disclosure may be configured with LDP convergence techniques. If there is a detected failure going in one way around the ring, the strategy includes switching packet traffic the other way in the opposite or reversed direction. The other nodes on the ring would continue to send the packet around the loop, as described in the embodiments of FIGS. 1-8.

In addition, the embodiment of FIG. 9 includes the additional feature of enabling the bypassing of nodes that are not equipped with the direction reversal apps discussed herein. With direction reversal, the nodes can handle the situation where one or more nodes on the ring do not know what is happening. If the node knows what is happening, it can simply continue to send the packet in the same direction. However, according to conventional systems, an unaware node would not know what to do and might send the packet back.

Of course, if data packets are destined for a particular node in the ring that does not support the direction reversal procedure of the present disclosure, the data packets can still be sent to this node directly without tunneling to the next node. In this case, the penultimate node is still configured to send the packets to the destination node in the ring. Since the packets are destined for that node, there is no issue and there is no need to form a tunnel. The node does not reject the packets because it realizes that it is the destination and does not need to forward the packets around the ring but can consume the packets as intended.

FIG. 10 is a flow diagram illustrating an embodiment of a process 110 that may be executed by each participating node in a network having a ring topology for performing the direction reversal procedure of the present disclosure. As shown, the process 110 includes a step of discovering a first peer node arranged in a first direction around the ring with respect to the node, as indicated in block 112. The process 110 further includes the step of discovering a second peer node arranged in a second direction around the ring with respect to the node, as indicated in block 114. Upon determining that data packets are propagating in the first direction and communication with the first peer node is interrupted, the process 110 further includes the step of performing the direction reversal procedure to propagate the data packets in the second direction, as indicated in block 116. In response to the second peer node being unable to perform the direction reversal procedure, the process 110 includes the step of tunnelling the data packets to a next node in the second direction to thereby bypass the second peer node, as indicated in block 118.

Of note, while the present disclosure is described with reference to MPLS, those skilled in the art will appreciate the same techniques are applicable to other technologies such as Segment Routing (SR) including SR with Internet Protocol (IP) version 4 and 6 control planes (IPv4, IPv6). The same concept is applicable for SRv6 (i.e., SR with IPv6 data-plane) as well. Each node in a ring just have to program two SRv6 forwarding entries (for clockwise and counterclockwise) for any SID with end behavior advertised by other nodes on the ring.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc. described herein can be used in any and all combinations with each other.

What is claimed is:

1. A node configured to operate in a network in which multiple nodes are arranged in a ring, the node comprising circuitry configured to:

discover a first peer node arranged in a first direction around the ring with respect to the node;

discover a second peer node arranged in a second direction around the ring with respect to the node;

upon determining that data packets are propagating in the first direction and communication with the first peer node is interrupted, initiate a direction reversal procedure to propagate the data packets in the second direction, wherein the direction reversal procedure comprises:

determine whether the second peer node is operational and supports the direction reversal procedure;

in response to the second peer node being operational and supports the direction reversal procedure, perform the direction reversal procedure to propagate the data packets in the second direction; and in response to the second peer node being operational and unable to perform the direction reversal procedure, establish a bypass tunnel using Multiprotocol Label Switching (MPLS) or Segment Routing through the second peer node to tunnel the data packets through the second peer node to a next node in the second direction without requiring the second peer node to perform the direction reversal procedure, wherein the bypass tunnel terminates at a next node beyond the second peer in the second direction, wherein the second peer node being unable to perform the direction reversal procedure includes the second peer node operating properly but not equipped to perform the direction reversal procedure, wherein the second peer node is bypassed via the tunnel, and wherein determining whether the second peer node supports the direction reversal procedure comprises receiving a capability indication flag from the second peer node during convergence at least when the second peer node supports the direction reversal.

2. The node of claim 1, wherein, upon determining that data packets are propagating in the second direction and communication with the second peer node is interrupted, the circuitry is further configured to perform a direction reversal procedure to propagate the data packets in the first direction.

3. The node of claim 2, wherein, in response to the first peer node being unable to perform the direction reversal procedure, the circuitry is further configured to tunnel the data packets to a next node in the first direction to thereby bypass the first peer node.

4. The node of claim 1, wherein the circuitry is further configured to perform as part of the direction reversal procedure, a convergence procedure to discover the first and second peer nodes and to determine that the network includes a ring topology, and wherein the convergence procedure further includes a routine of determining which of the multiple nodes are equipped to perform the direction reversal procedure.

5. The node of claim 4, wherein the convergence procedure includes Label Distribution Protocol (LDP) and allows the node to share its prefix with other nodes of the network for allocation in routing tables associated with the other nodes.

6. The node of claim 4, wherein the determining which of the multiple nodes are equipped to perform the direction reversal procedure is determined via extensions of one or more of Interior Gateway Protocol (IGP) or Border Gateway Protocol (BGP) protocols.

7. The node of claim 1, wherein the multiple nodes are arranged in multiple rings in the network and the node is associated with at least two rings, and wherein the circuitry is further configured to:

discover pairs of peer nodes in two different directions around each of the at least two rings, wherein the ring is one of the at least two rings;

upon determining that second data packets are propagating in one direction around a second ring of the at least two rings and communication with a peer node in the one direction is interrupted, perform a second direction reversal procedure to propagate the second data packets in an opposite direction around the second ring; and tunnel the second data packets to a next available node in the opposite direction to thereby bypass a next peer node when the next peer node is not equipped to perform the second direction reversal procedure.

8. The node of claim 1, wherein the circuitry is further configured to use Multiprotocol Label Switching (MPLS) tables configured to define Label Switched Paths (LSPs) for propagating second data packets in the first and second directions around the ring.

9. A method configured to be executed in a network in which multiple nodes are arranged in a ring, the method comprising the steps of:

discovering a first peer node arranged in a first direction around the ring with respect to a node;

discovering a second peer node arranged in a second direction around the ring with respect to the node;

upon determining that data packets are propagating in the first direction and communication with the first peer node is interrupted, initiating a direction reversal procedure to propagate the data packets in the second direction;

determining whether the second peer node is operational and supports the direction reversal procedure; and wherein the second peer node is operational and unable to perform the direction reversal procedure, establish a bypass tunnel using Multiprotocol Label Switching (MPLS) or Segment Routing through the second peer node to tunnel the data packets through the second peer node to a next node in the second direction without requiring the second peer node to perform the direction reversal procedure, wherein the bypass tunnel terminates at a next node beyond the second peer in the second direction, wherein the second peer node is unable to perform the direction reversal procedure due to the second peer node being operating properly but not equipped to perform the direction reversal procedure, wherein the second peer node is bypassed via the tunnel, and wherein determining whether the second peer node supports the direction reversal procedure comprises receiving a capability indication flag from the second peer node during convergence at least when the second peer node supports the direction reversal.

10. The method of claim 9, further comprising the step of performing a direction reversal procedure to propagate the data packets in the first direction upon determining that data packets are propagating in the second direction and communication with the second peer node is interrupted.

11. The method of claim 10, further comprising the step of tunnelling the data packets to a next node in the first direction to thereby bypass the first peer node in response to determining that the first peer node is unable to perform the direction reversal procedure.

12. The method of claim 9, further comprising the steps of: performing a convergence procedure to discover the first and second peer nodes and to determine that the network includes a ring topology; and determining which of the multiple nodes are equipped to perform the direction reversal procedure.

13. A non-transitory computer-readable medium stored on a node arranged in a network having a ring topology in which multiple nodes are arranged in a ring, the non-transitory computer-readable medium having logic configured to enable one or more processors to perform the steps of:

discovering a first peer node arranged in a first direction around the ring with respect to a node;

discovering a second peer node arranged in a second direction around the ring with respect to the node;

upon determining that data packets are propagating in the first direction and communication with the first peer node is interrupted, initiate a direction reversal procedure to propagate the data packets in the second direction, wherein the direction reversal procedure comprises:

determining whether the second peer node is operational and supports the direction reversal procedure;

in response to the second peer node being operational and supports the direction reversal procedure, performing the direction reversal procedure to propagate the data packets in the second direction; and in response to the second peer node being operational and unable to perform the direction reversal procedure, establish a bypass tunnel using Multiprotocol Label Switching (MPLS) or Segment Routing through the second peer node to tunnel the data packets through the second peer node to a next node in the second direction without requiring the second peer node to perform the direction reversal procedure, wherein the bypass tunnel terminates at a next node beyond the second peer in the second direction, wherein the second peer node being unable to perform the direction reversal procedure includes the second peer node operating properly but not equipped to perform the direction reversal procedure, wherein the second peer node is bypassed via the tunnel, and wherein determining whether the second peer node supports the direction reversal procedure comprises receiving a capability indication flag from the second peer node during convergence at least when the second peer node supports the direction reversal.

14. The non-transitory computer-readable medium of claim 13, wherein, upon determining that data packets are propagating in the second direction and communication with the second peer node is interrupted, the logic further enables the one or more processors to perform a direction reversal procedure to propagate the data packets in the first direction, and wherein, in response to the first peer node being unable to perform the direction reversal procedure, the logic further enables the one or more processors to tunnel the data packets to a next node in the first direction to thereby bypass the first peer node.

15. The non-transitory computer-readable medium of claim 13, wherein the logic further enables the one or more processors to perform a convergence procedure to discover the first and second peer nodes and to determine that the network includes a ring topology, and wherein the convergence procedure further includes routines for:

determining which of the multiple nodes are equipped to perform the direction reversal procedure; and establishing one or more tunnels to bypass one or more nodes that are not equipped to perform the direction reversal procedure.

* * * * *